(12) United States Patent
Harrison et al.

(10) Patent No.: US 8,332,337 B2
(45) Date of Patent: Dec. 11, 2012

(54) CONDITION-BASED MONITORING SYSTEM FOR MACHINERY AND ASSOCIATED METHODS

(75) Inventors: Gregory A. Harrison, Oviedo, FL (US);
Michael A. Bodkin, Orlando, FL (US);
Michelle L. Harris, Oviedo, FL (US);
Stefan Herzog, Casselberry, FL (US);
Eric W. Worden, Orlando, FL (US);
Sreerupa Das, Oviedo, FL (US);
Richard Hall, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 524 days.

(21) Appl. No.: 12/581,402

(22) Filed: Oct. 19, 2009

(65) Prior Publication Data

US 2010/0114806 A1   May 6, 2010

Related U.S. Application Data

(60) Provisional application No. 61/106,243, filed on Oct. 17, 2008.

(51) Int. Cl.
*G06E 1/00* (2006.01)
*G06E 3/00* (2006.01)
*G06F 15/18* (2006.01)
*G06G 7/00* (2006.01)

(52) U.S. Cl. .............. 706/20; 706/15; 706/16; 706/17; 706/18; 706/19; 706/21; 706/22; 700/1; 700/28; 700/29; 700/30; 700/31; 700/32; 700/33; 700/47; 700/48; 700/49; 700/50; 700/104

(58) Field of Classification Search .................. None
See application file for complete search history.

(56) References Cited

U.S. PATENT DOCUMENTS

| | | | |
|---|---|---|---|
| 6,301,572 B1* | 10/2001 | Harrison ..................... | 706/52 |
| 6,741,974 B1* | 5/2004 | Harrison et al. ............. | 706/47 |
| 7,277,823 B2 | 10/2007 | Harrison et al. | |
| 7,308,322 B1* | 12/2007 | Discenzo et al. ............ | 700/28 |
| 7,577,539 B2 | 8/2009 | Hubanks et al. | |
| 2004/0078351 A1* | 4/2004 | Pascual-Marqui et al. ..... | 706/15 |
| 2005/0096873 A1* | 5/2005 | Klein ........................ | 702/184 |
| 2007/0094173 A1* | 4/2007 | Harrison et al. ............. | 706/16 |
| 2007/0282773 A1* | 12/2007 | Harrison et al. ............. | 706/25 |

OTHER PUBLICATIONS

Carpenter et al. "Adaptive Resonance Theory", The Handbook of Brain Theory and Neural Networks, 1998, 12 pages.*
Carpenter et al. "Fuzzy ARTMAP: A Neural Network Architecture for Incremental Supervised Learning of Analog Multidimensional Maps", IEEE transactions on neural networks, 1992, pp. 698-713.*

* cited by examiner

*Primary Examiner* — Omar Fernandez Rivas
(74) *Attorney, Agent, or Firm* — Withrow & Terranova, PLLC

(57) ABSTRACT

Real-time condition-based analysis is performed on a machine for providing diagnostic and prognostic outputs indicative of machine status includes a signal processor for receiving signals from sensors adapted for measuring machine performance parameters. The signal processor conditions and shapes at least some of the received signals into an input form for a neural network. A fuzzy adaptive resonance theory neural network receives at least some of the conditioned and shaped signals, and detects and classifies a state of the machine based upon the received conditioned and shaped signals, and upon a predetermined ontology of machine states, diagnostics, and prognostics. The neural network can also determine from the machine state a health status thereof, which can comprise an anomaly, and output a signal representative of the determined health status. A Bayesian intelligence network receives the machine state from the neural network and determines a fault probability at a future time.

24 Claims, 6 Drawing Sheets

CONDITION-BASED MONITORING SYSTEM FOR MACHINERY AND ASSOCIATED METHODS

CROSS-REFERENCE TO RELATED APPLICATIONS

This application claims priority to provisional patent application Ser. No. 61/106,243, filed on Oct. 17, 2009.

BACKGROUND OF THE INVENTION

1. Field of the Invention

The present invention relates to systems and methods for monitoring machinery in order to diagnose and predict failure of an element thereof.

2. Description of Related Art

The use of neural networks to receive and process data from a plurality of sensors positioned and adapted for monitoring operating parameters of a device is known. For example, U.S. Pat. No. 6,301,572, co-owned with the present invention, and the contents of which are incorporated herein by reference, discloses a system and method for tracking the long-term performance of a vibrating body such as a turbine that employs a fuzzy adaptive resonance theory neural network.

U.S. Pat. No. 6,741,974, co-owned with the present invention, and the contents of which are incorporated herein by reference, discloses a system and method for incorporating machine learning and automatic adaptation to respond to changing environmental conditions. The specific systems and methods taught therein incorporate genetic algorithms, learning classifier systems, and agent technology to form a complex adaptive system.

U.S. Pat. No. 7,277,823, also co-owned with the present invention, and the contents of which are incorporated herein by reference, discloses a system and method for monitoring an operating device that employs a neural network that receives and processes sensor data for detecting and predicting anomalies in the operating device parameters.

It would be desirable to provide a system and method for performing real-time condition-based analysis on equipment, integrating the above-referenced technologies, to achieve diagnostic and prognostic outputs indicative of the status of the equipment based upon sensor data.

SUMMARY OF THE INVENTION

The present invention is directed to a system for performing real-time condition-based analysis on a machine for providing diagnostic and prognostic outputs indicative of machine status. The system comprises a signal processor for receiving signals from a plurality of sensors positioned and adapted for measuring a plurality of machine performance parameters. The signal processor conditions and shapes at least some of the received signals into a form suitable for inputting into a neural network.

A fuzzy adaptive resonance theory neural network is adapted to receive at least some of the conditioned and shaped signals, and to detect and classify a state of the machine based upon the received conditioned and shaped signals, and upon a predetermined ontology of machine states, diagnostics, and prognostics. The neural network can also determine from the machine state a relative health thereof, and output a signal representative of the determined relative health.

A Bayesian intelligence network is adapted to receive the machine state from the neural network and to determine therefrom and output a probability of a fault at a predetermined future time.

DETAILED DESCRIPTION OF THE PREFERRED EMBODIMENTS

A description of the preferred embodiments of the present invention will now be presented with reference to FIGS. 1-5B.

A system 10 (FIG. 1) and method 100 (FIGS. 5A,5B) are provided for performing real-time condition-based analysis on a machine for providing diagnostic and prognostic outputs indicative of machine status. The system 10 and method 100 provide rapid diagnostics based upon a minimized set of engine signal information. The system 10 can be fielded with the machine, for example, an engine 11, and can be automatically tuned to a particular engine, in place, for enhanced problem detection and monitoring.

Figure 1:
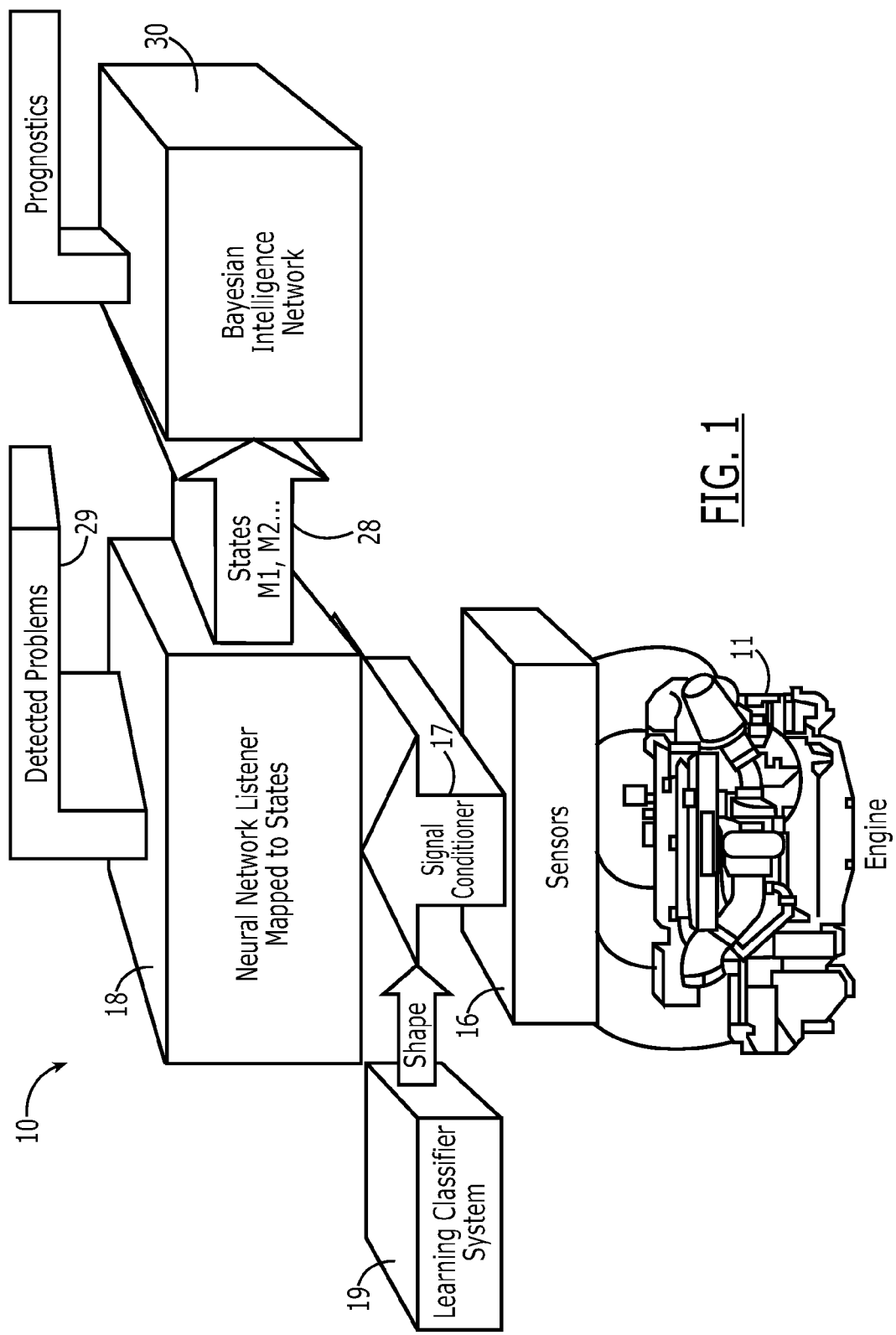
FIG. 1 is a high-level schematic diagram of an exemplary fault diagnostics and prognostics system for machinery.
Figure 2:
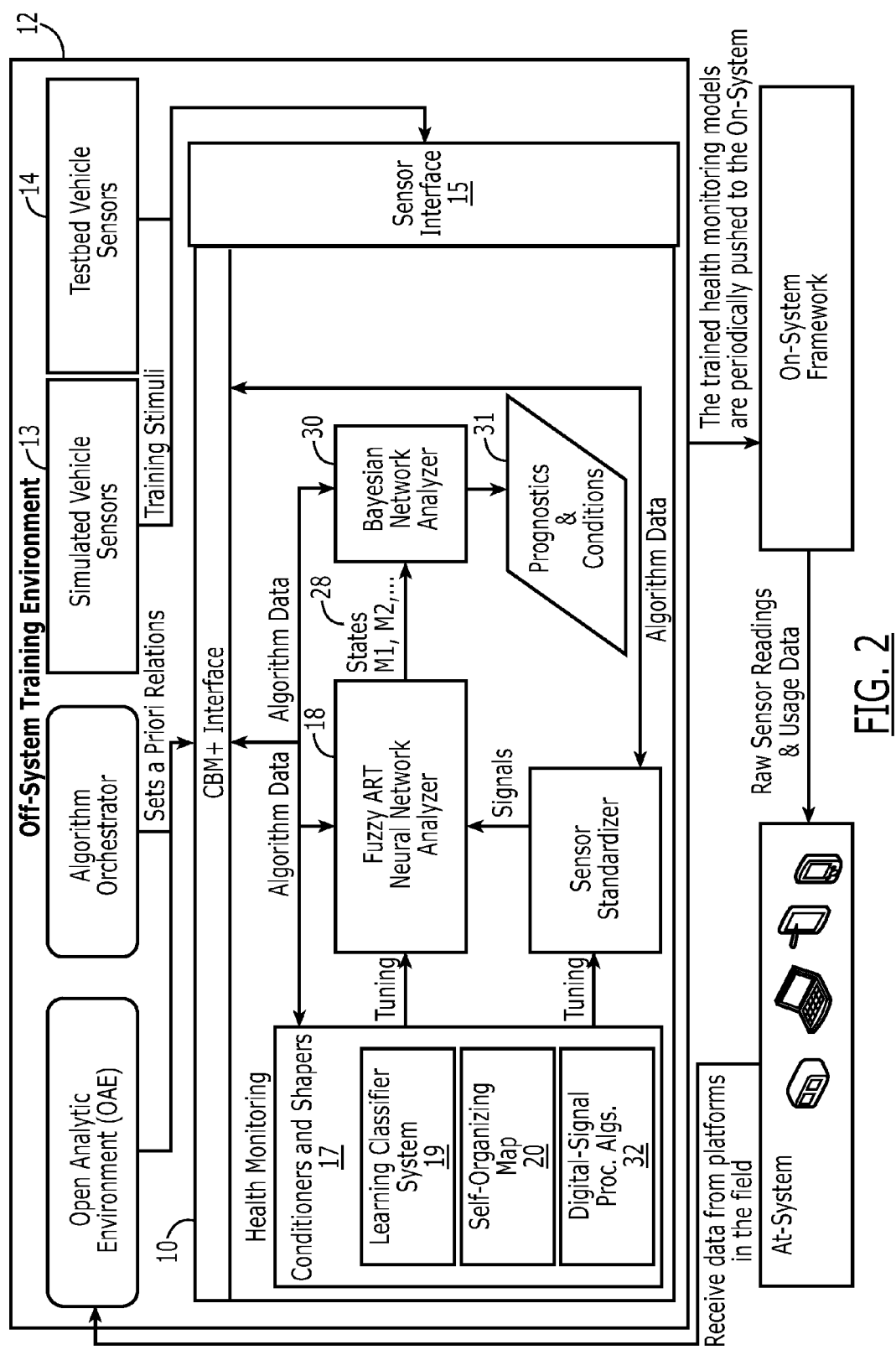
FIG. 2 is a schematic diagram of an exemplary off-system training environment.

Initialization is performed by obtaining data on a large set of machines in a common class with the subject machine, using an off-system training environment 12 (block 101; FIG. 2). Data are collected from, for example, simulated vehicle sensors 13 and testbed vehicle sensors 14 (block 102). These data are transmitted via a sensor interface 15 to the condition-based monitoring system 10 (block 103), which will be discussed in detail in the following. Engine class information is also obtained (block 104), comprising a set of failure and maintenance data previously collected.

The initialization procedure includes training a neural network 18 (block 105) to detect anomalies intrinsic to the subject engine 11. An ontology of engine states, diagnostics, and prognostics is created thereby, providing a means to control the configuration of a fielded system and to interpret output from the system 10 on the subject machine 11. A Bayesian network 30, to be discussed in the following, is also initialized using output from the neural network 18 and historical/fault data (block 105a). The created ontology is checked for consistency using subject-matter experts having knowledge of the class of machines (block 106), in order to ensure that the encoded intelligence provides a valid and machine-actionable set of information.

The created ontology, representing a hierarchical structuring of knowledge, permits human diagnosticians to view expected detection probabilities and update the system 10 for new failure modes and prediction capabilities as they are discovered.

Figure 3:
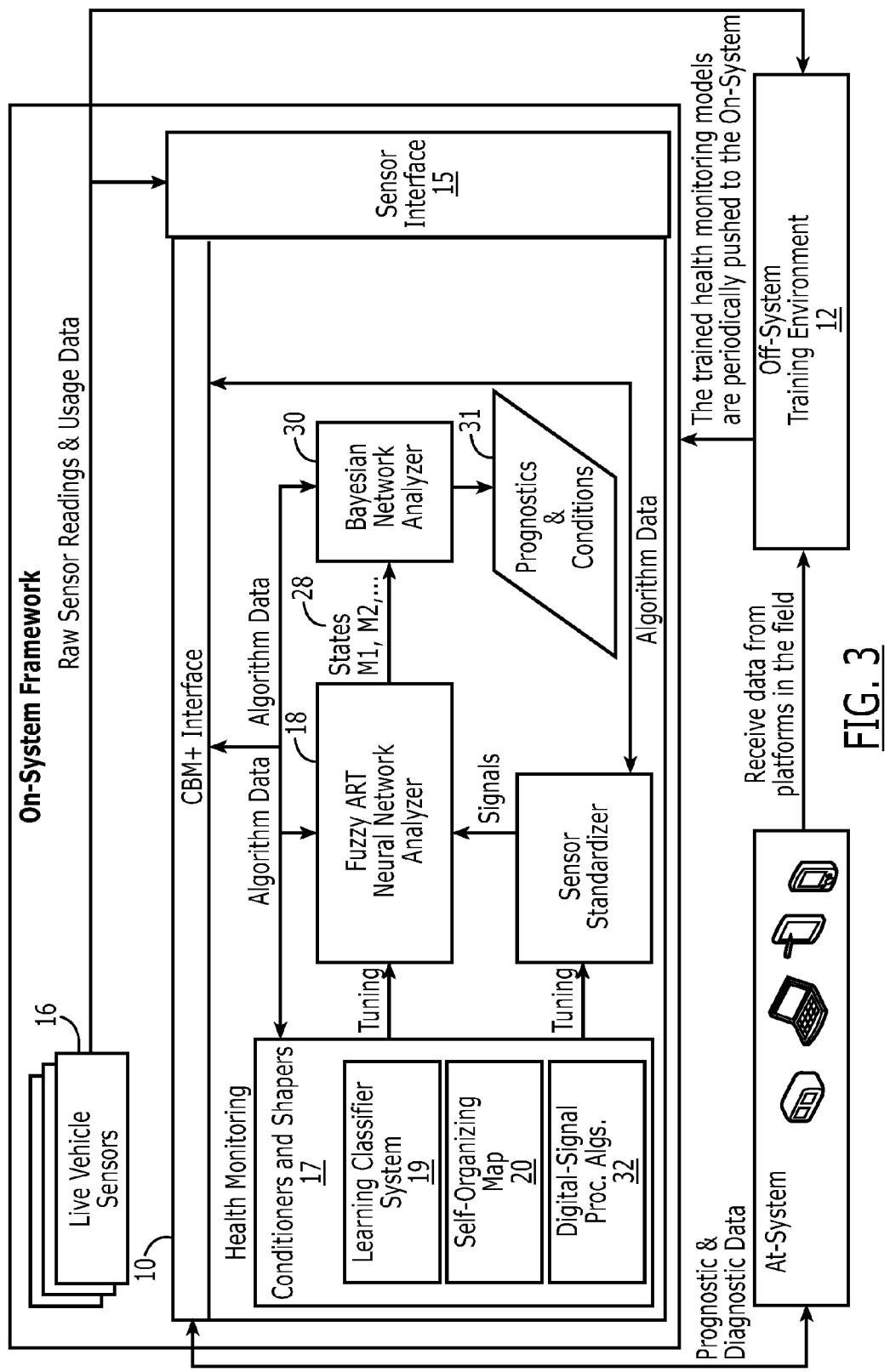
FIG. 3 is a schematic diagram of an exemplary on-system framework.

The subject engine 11 is outfitted with a sensor suite 16 comprising a plurality of sensors known to yield optimal capabilities for distinguishing engine state and provide prognostic indication (block 107; FIG. 3).

During operation of the engine 11, the sensors 16 emit signals representative of a plurality of engine performance parameters and fault conditions (block 108). These signals are fed to a signal processor 17 (block 109) that shapes and conditions the signals preparatory to being fed to a neural network 18. The signal processor 17 broadly comprises a learning classifier system 19, a self-organizing map 20, and a suite of digital-signal processing algorithms 32 that analyze the incoming signals to produce features that define the input sensor signals.

The learning classifier system 19 uses pattern recognition and data-mining techniques to determine an optimal subset of the set of signals for best indicating the engine state and how best to transform the signals for optimal interpretation and representation of the signal information for the downstream neural network 18 (block 110), both for diagnostics and prognostics, in order to assist in separating the decision regions in state space. The data-mining techniques can comprise, for example, correlation analysis and machine learning. Additionally, the information provided by subject-matter experts is used to facilitate state detection (block 111).

The selection of parameters for separation of decision surfaces in the signal conditioner 17 can be enhanced with any of a number of mathematical algorithms known in the art. In an embodiment believed to represent a best mode as of the time of filing, genetic programming and genetic algorithm techniques are used to optimize the selection of signal conditioning parameters (block 112), in order to enhance the creation of system state decision boundaries, for helping to ensure correct prognostics and more effective diagnostic state identification. Simulation of the system 10 with parameters controlled by genetic algorithm tools are used to establish a basis for the genetic search (block 113), and a fitness function is based upon the ability to provide a correct system state using different sets of signal transformation parameters (block 114). The genetic processing system can comprise that disclosed in U.S. Pat. No. 6,741,974, referred to above. The system 10 can be tuned to directly learn the subject engine characteristics, and can also use heuristics and information learned relating to the engine class as a whole, as in block 104.

The signal conditioning also comprises using a self-organizing map 20 for reducing a dimensionality of the received signals (block 115), and thereby removes noise and accent signals from the received signals. The self-organizing map 20 accepts higher-dimensional vectors from real-time data 21 (FIG. 4) and generates a set of low-dimensional vectors V1 22, V2 23, and V3 24. This step reduces a complexity of the subsequent neural network 18 and increases an accuracy of the feature (mode/regime) identification. The self-organizing map 20 further provides an indication of the current operational mode of the machinery 11.

The system 10 further comprises a neural network, preferably a fuzzy adaptive resonance theory neural network 18, as in the manner previously disclosed in the above referenced U.S. Pat. No. 7,277,823. This neural network 18 is adapted to receive at least some of the conditioned and shaped signals (block 116). The neural network 18, which typically comprises a plurality of fuzzy ARTMAPs (otherwise known as predictive adaptive resonance theory networks) 25-27 (FIG. 4), is trained to detect and classify a previously known state of the engine 11 (block 117) based upon the received conditioned and shaped signals and upon a predetermined ontology of machine states, diagnostics, and prognostics (block 118). Sensor states of the engine 11 that have failed previously can be accessed and combined with data from the subject engine 11 to permit detection of engine states that have not been experienced previously (block 119). Thus the neural network 18 serves as the prime detector of health status and dynamic changes in machine state as detected from time-based engine operating state evolution, providing the capability to fuse information from a plurality of sensors 16 into discernable operating states M1, M2, . . . 28. The neural network 18 determines health status (block 120) and outputs a signal 29 representative thereof (block 121). For example, if the neural network 18 determines the presence of an anomaly from the machine state, a signal representative of the determined anomaly is output.

The neural network 18 is also adapted to detect the health status of the engine 11 by comparing the current input with knowledge previously learned by the neural network 18. Thus, in addition to anomaly detection, the neural network 18 provides a gradation indication of the state of the engine 11, indicating how close the current operation of the engine 11 is to normal or abnormal operation.

The system 10 further comprises a Bayesian intelligence network 30 that receives the machine states 28 from the neural network 18 (block 122), based upon learned clustering of engine state reports by the neural network 22. Bayesian decision theory is used to calculate a posteriori probabilities of the need for engine maintenance (block 123) based upon the input states 28 and recorded probabilities of service requirements given a current state of the engine 11. The output 31 (block 124) can be of the form: ProbabilityOf (service in 180 hours) or ProbabilityOf (service in 360 hours), for example. These predictions are more finely tuned to identify various subsystems or components on the engine 11 that are likely to require service in a predetermined time frame.

Figure 4:
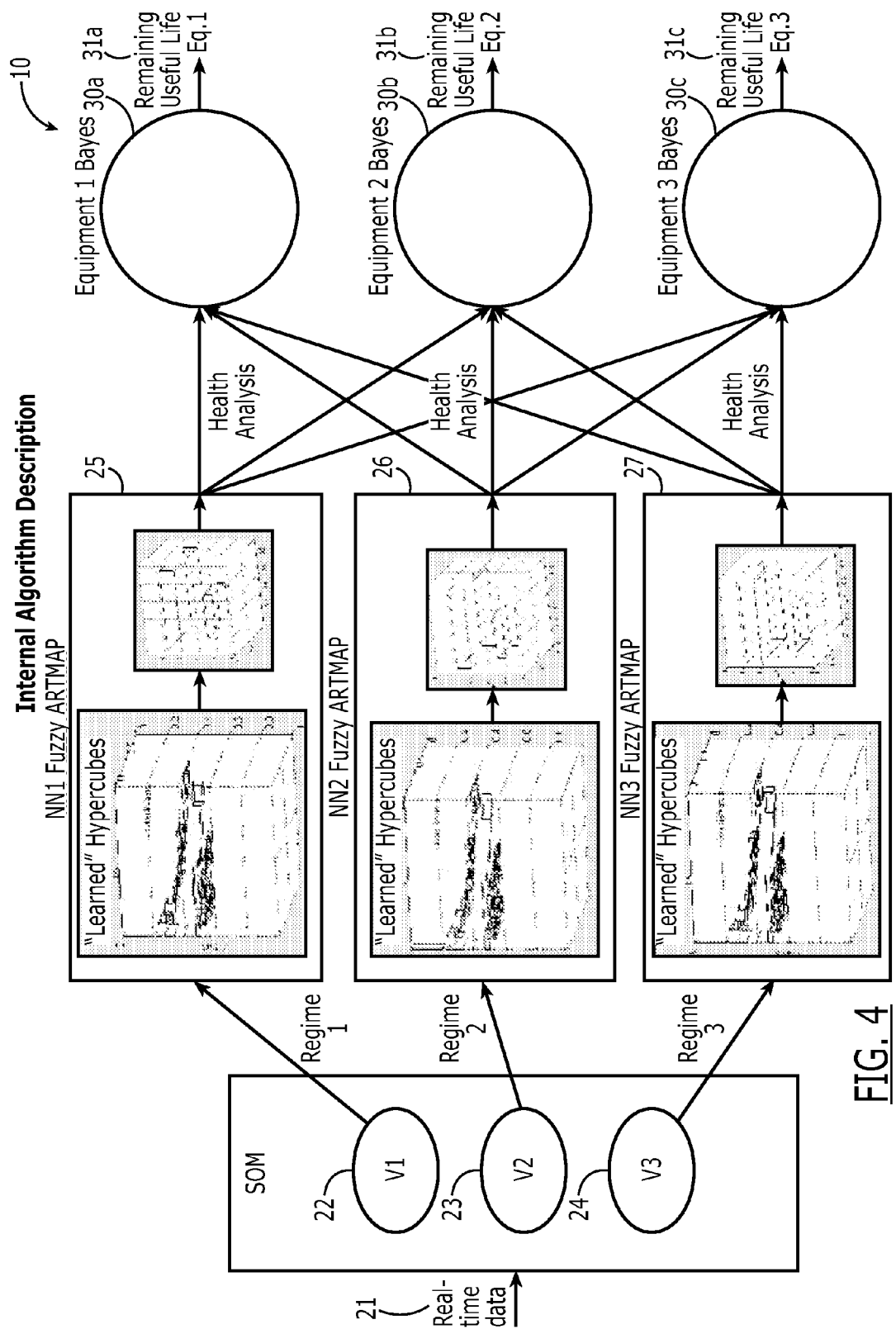
FIG. 4 is a schematic diagram of an exemplary internal algorithm for fault prognostication.
Figure 5A:
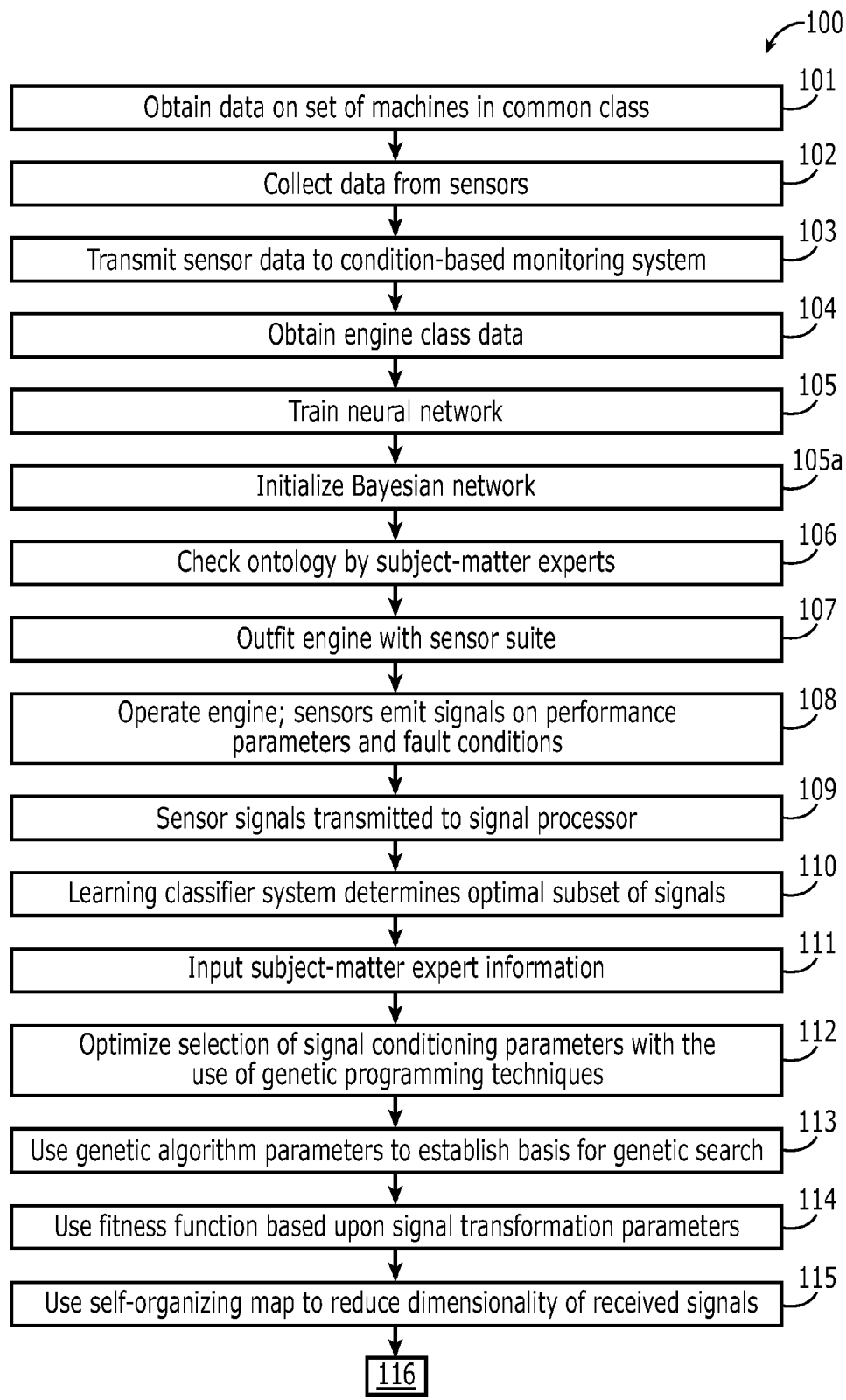
FIGS. 5A, 5B is a flowchart of an exemplary fault diagnostics and prognostics method for machinery.
Figure 5B:
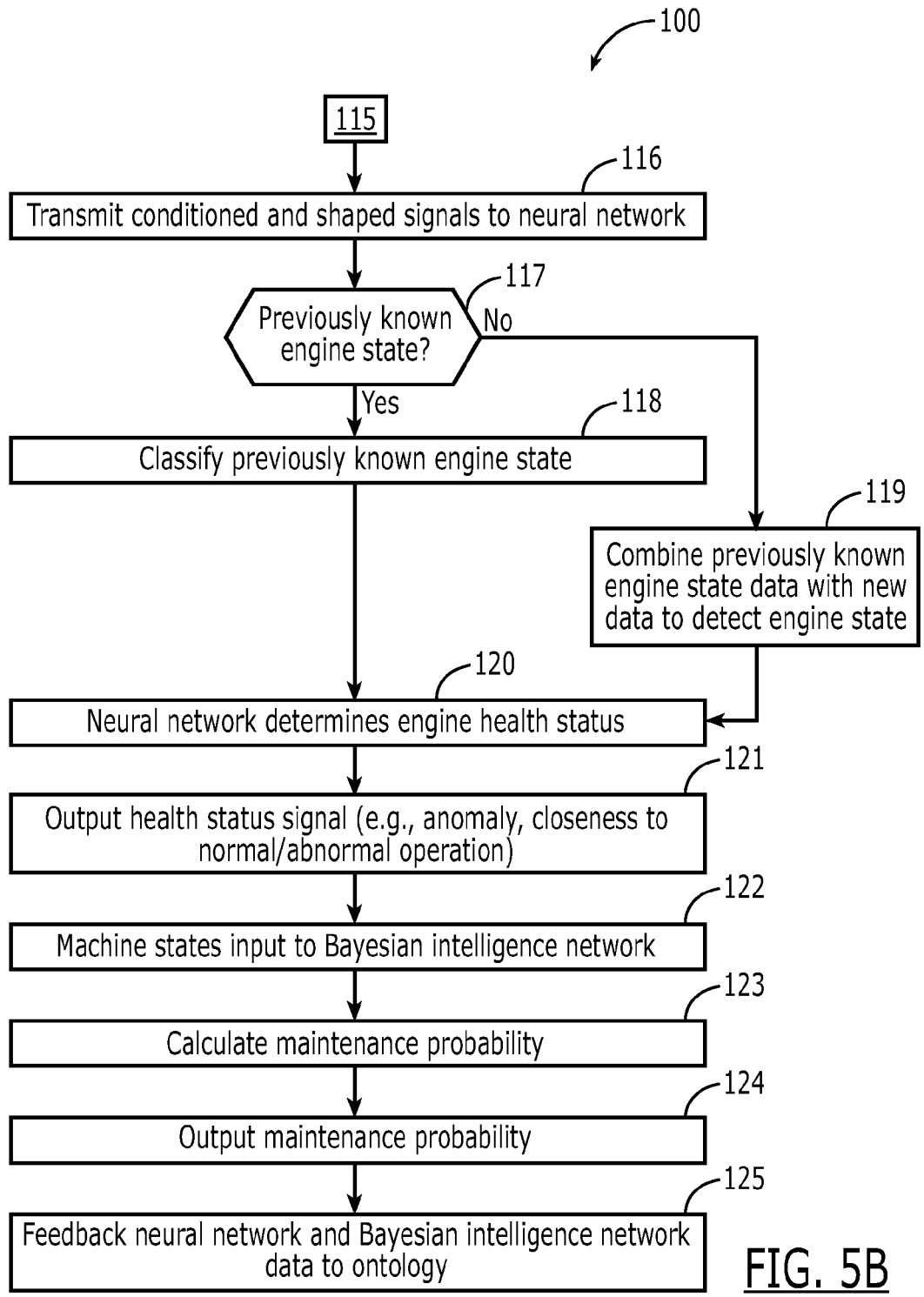

As illustrated in FIG. 4, the Bayesian intelligence network 30 can comprise a plurality thereof 30a-30c, each receiving input from the plurality of fuzzy ARTMAPs 25-27, and each outputting a remaining useful life of the equipment (Eqs. 1-3) 31a-31c. These equations represent their respective instances of the Bayesian intelligence network 30, each instance modeling the remaining life of a particular component (serialized asset) based upon the prior relations from operation modes to component health (fault trees, part breakdown structures, etc.) and the probability of that relation occurring. If historical data are lacking or dubious, the probabilities of the relationships are given equal weight.

Results obtained by both the neural network 18 and the Bayesian intelligence network 30 are also fed back to the ontology of engine states, diagnostics, and prognostics (block 125), in order to continue training the system 10.

It can be seen that the system 10 and method 100 provide outputs representative of detected problems and prognostic predictions, which will assist machine operators and can be used as inputs to machine control systems and logistics systems. Rapidly detected problems can serve to cause a shutdown, unless an override is in place, thereby limiting damage to machinery. Prognostic information can be used to schedule service and to pre-stage the delivery of engine components through the logistics system.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for performing real-time condition-based analysis on a machine for providing diagnostic and prognostic outputs indicative of machine status comprising:
   a signal processor for receiving signals from a plurality of sensors positioned and adapted for measuring a plurality of machine performance parameters, for conditioning and shaping at least some of the received signals into a form for inputting into a neural network, for identifying a current operational mode of a plurality of operational modes of the machine, and for selecting a particular neural network of a plurality of neural networks to which the conditioned and shaped signals are to be provided based at least in part on the current operational mode;
   the plurality of neural networks including the particular neural network, the plurality of neural networks each adapted to receive at least some of the conditioned and shaped signals, each neural network associated with a different operational mode of the plurality of operational modes and configured to detect and classify a state of the machine based upon the received conditioned and shaped signals and upon a predetermined ontology of machine states, diagnostics, and prognostics, to determine from the machine state a relative health status thereof, and to output a signal representative of the determined relative health status; and a Bayesian intelligence network adapted to receive the machine state from the neural network and to determine therefrom and output a probability of a fault at a predetermined future time.

2. The system recited in claim 1, wherein the signal processor is further adapted for selecting from the received signals a subset thereof based upon pattern recognition and optimizing the selected subset of signals.

3. The system recited in claim 2, wherein the subset-selecting is accomplished with the use of correlation and previously learned machine state data.

4. The system recited in claim 3, wherein the previously learned machine state data comprise data input from a subject matter expert having knowledge of the machine.

5. The system recited in claim 3, wherein the machine comprises a subject machine, and the previously learned machine state data comprise data on a second machine in a same class as the subject machine.

6. The system recited in claim 2, wherein the optimizing is accomplished with the use of a genetic algorithm and. programming system.

7. The system recited in claim 1, wherein the signal processor comprises a filter for removing noise and accent signals from the received signals.

8. The system recited in claim 7, wherein the filter comprises a self-organizing map for reducing a dimensionality of the received signals.

9. The system recited in claim 1, wherein the plurality of neural networks comprises fuzzy adaptive resonance theory neural networks.

10. The system recited in claim 1, wherein the machine state comprises a plurality of machine states, each machine state representative of a component of the machine.

11. The system recited in claim 1, wherein the relative health status comprises at least one of an anomaly and an indication of a closeness of the machine state to a predetermined normal operation state.

12. The system recited in claim 1, further comprising:
a plurality of Bayesian intelligence networks including the Bayesian intelligence network, each Bayesian intelligence network being associated with a different type of machine; and
wherein the each neural network is configured to provide the machine state to a particular Bayesian intelligence network of the plurality of Bayesian intelligence networks based on a type of machine associated with the received signals.

13. A method for performing real-time condition-based analysis on a machine for providing diagnostic and prognostic outputs indicative of machine status comprising:
conditioning and shaping signals received from a plurality of sensors positioned and adapted for measuring a plurality of machine performance parameters into a form for inputting into a neural network;
identifying a current operational mode of a plurality of operational modes of the machine;
selecting a particular neural network of a plurality of neural networks to which the conditioned and shaped signals are to be provided based at least in part on the current operational mode, each neural network associated with a different operational mode of the plurality of operational modes;
inputting at least some of the conditioned and shaped signals into the particular neural network, the particular neural network adapted to detect and classify a state of the machine based upon the received conditioned and shaped signals and upon a predetermined ontology of machine states, diagnostics, and prognostics;
using the particular neural network to determine from the machine state a relative health status of the machine;
outputting a signal representative of the determined relative health status;
inputting the machine state into a Bayesian intelligence network adapted to determine therefrom a probability of a fault at a predetermined future time; and
outputting the determined fault probability.

14. The method recited in claim 13, wherein the conditioning and shaping comprises selecting from the received signals a subset thereof based upon pattern recognition and optimizing the selected subset of signals.

15. The method recited in claim 14, wherein the subset-selecting is accomplished with the use of correlation and previously learned machine state data.

16. The method recited in claim 15, further comprising, prior to the conditioning and shaping, receiving data from a subject matter expert having knowledge of the machine, and incorporating the subject matter received data into the previously learned machine state data.

17. The method recited in claim 15, wherein the machine comprises a subject machine, and further comprising, prior to the conditioning and shaping, receiving data on a second machine in a same class as the subject machine and incorporating the data on the second machine into the previously learned machine state data.

18. The method recited in claim 14, wherein the optimizing comprises using a genetic algorithm and programming system.

19. The method recited in claim 13, wherein the conditioning and shaping comprises filtering the received signals to remove noise and accent signals therefrom.

20. The method recited in claim 19, wherein the filtering comprises reducing a dimensionality of the received signals with the use of a self-organizing map.

21. The method recited in claim 13, wherein the plurality of neural networks comprises fuzzy adaptive resonance theory neural networks.

22. The method recited in claim 13, wherein the machine state comprises a plurality of machine states, each machine state representative of a component of the machine.

23. The method recited in claim 13, wherein the relative health status comprises at least one of an anomaly and an indication of a closeness of the machine state to a predetermined normal operation state.

24. The method recited in claim 23, wherein the relative health status comprises an anomaly, and further comprising incorporating at least one of the determined anomaly and the determined fault probability into the ontology of machine states, in order to continue training the particular neural network for subsequent use.

* * * * *